United States Patent [19]
Kiyose et al.

[11] Patent Number: 5,914,397
[45] Date of Patent: *Jun. 22, 1999

[54] CELLULOSE ACETATE EXCELLENT IN PHYSICAL STRENGTH, AND PROCESS FOR PRODUCTION THEREOF

[75] Inventors: Atsunobu Kiyose; Shu Shimamoto; Yuichiro Shuto; Hiroki Taniguchi, all of Hyogo, Japan

[73] Assignee: Daicel Chemical Industries, Ltd., Osaka, Japan

[ * ] Notice: This patent is subject to a terminal disclaimer.

[21] Appl. No.: 08/750,182

[22] PCT Filed: Mar. 29, 1996

[86] PCT No.: PCT/JP96/00861

§ 371 Date: Nov. 21, 1996

§ 102(e) Date: Nov. 21, 1996

[87] PCT Pub. No.: WO96/30412

PCT Pub. Date: Oct. 3, 1996

[30] Foreign Application Priority Data

Mar. 31, 1995 [JP] Japan .................... 7-100710
Apr. 11, 1995 [JP] Japan .................... 7-85551
Nov. 10, 1995 [JP] Japan .................... 7-292668

[51] Int. Cl.⁶ ................. C08B 3/06; C08B 1/02
[52] U.S. Cl. ................ 536/71; 536/69; 536/70; 536/76; 536/80
[58] Field of Search ................ 536/30, 32, 69, 536/80, 124, 70, 71, 76

[56] References Cited

U.S. PATENT DOCUMENTS 4,024,334  5/1977  Chandler et al. .................. 536/65
4,162,359  7/1979  Leithem et al. .................... 536/70
4,269,972  5/1981  Yabune et al. ..................... 536/71
4,306,060  12/1981 Ikemoto ............................ 536/69
4,312,980  1/1982  Motozato et al. .................. 536/76
4,501,886  2/1985  O'Brien ............................ 536/57
4,551,389  11/1985 Ohtake et al. .................... 428/402
4,697,007  9/1987  Seitz et al. ...................... 536/83
4,983,730  1/1991  Domeshek et al. ................. 536/69
5,047,180  9/1991  Steiner et al. .................... 264/5
5,114,535  5/1992  Burley et al. ..................... 162/9
5,142,034  8/1992  Bellas et al. ..................... 536/58
5,244,945  9/1993  Elion .............................. 524/10
5,288,318  2/1994  Mayer et al. ..................... 106/213
5,371,207  12/1994 Zhuang ............................ 536/58
5,449,555  9/1995  Karstens et al. .................. 428/364
5,478,386  12/1995 Itoh et al. ....................... 106/169
5,597,912  1/1997  Edgar et al. ...................... 536/63
5,663,310  9/1997  Shimoda et al. ................... 536/69

*Primary Examiner*—Howard C. Lee
*Attorney, Agent, or Firm*—Flynn, Thiel, Boutell & Tanis, P.C.

[57] ABSTRACT

An object of the invention is to obtain cellulose acetate having improved physical properties, particularly film strength and improved flexibility of the molded product. Cellulose acetate having an average degree of acetylation of not less than 59%, viscosity average degree of polymerization (DP) of not less than 290, and concentrated solution viscosity ($\eta$) according to falling ball viscosity method for viscosity average degree of polymerization (DP) expressed by the following formula (1):

$$2.814 \times \ln(DP) - 11.753 \leq \ln(\eta) \leq 7.28 \times \ln(DP) - 37.059 \quad (1)$$

and a process for the production thereof.

9 Claims, 1 Drawing Sheet

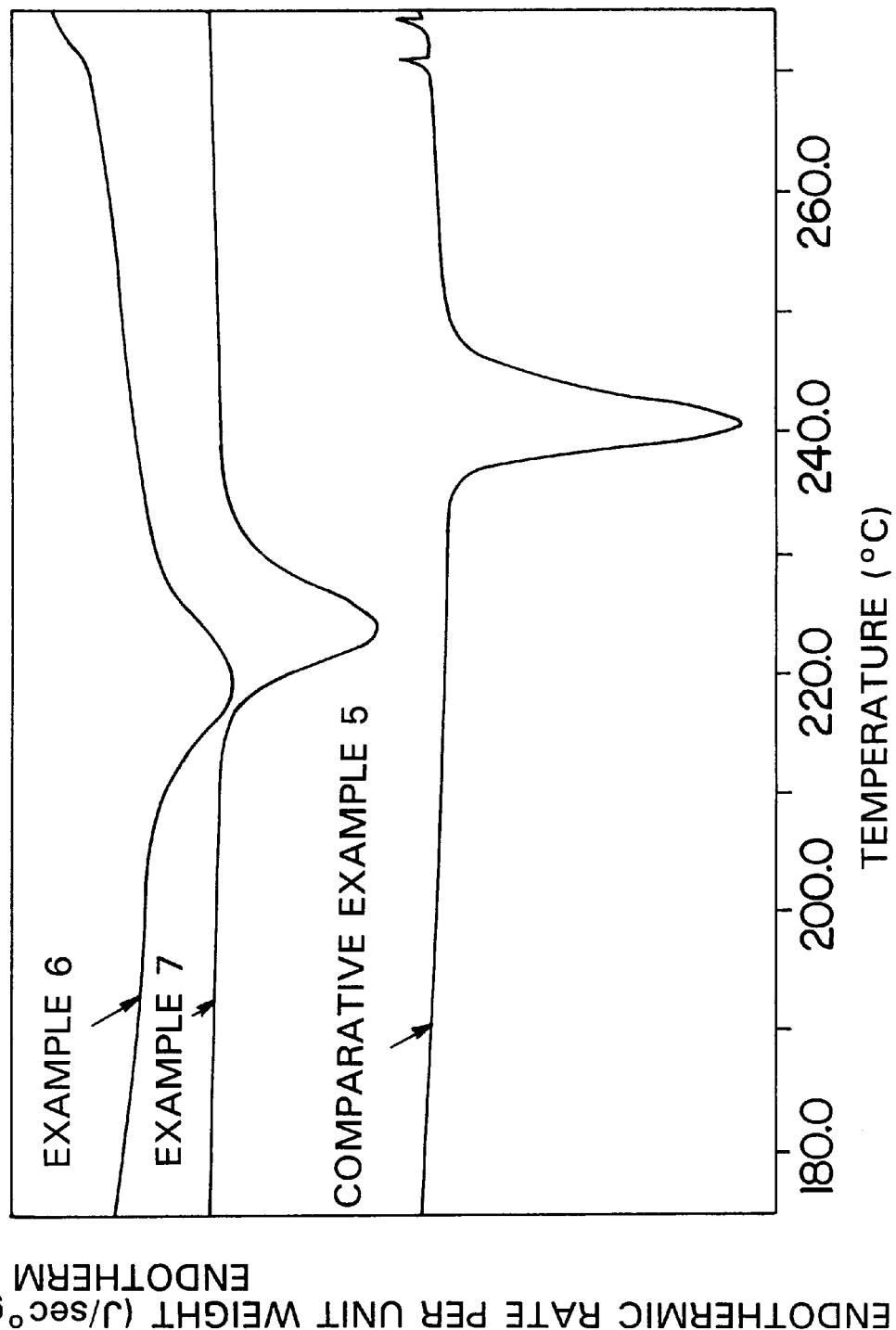

CELLULOSE ACETATE EXCELLENT IN PHYSICAL STRENGTH, AND PROCESS FOR PRODUCTION THEREOF

This application is a 371 of PCT/JP96/00861 filed on Mar. 29, 1996.

FIELD OF THE INVENTION

The present invention relates to cellulose acetate useful as a raw material for plastics, films, fibers, medical materials, and a process for the production thereof.

BACKGROUND ART

Cellulose acetate, particularly cellulose triacetate, which has excellent physical properties, particularly good processability and high optical properties, has been utilized for many years in the field of plastics, fibers, films (e.g., photographic film, etc.). Further, cellulose acetate has attracted attention from the viewpoint of the global environment because it possesses biodegradability.

In general, cellulose acetate is a semi-synthetic polymer obtained by esterification from cellulose as a starting material using acetic anhydride. Presently, commercially available cellulose acetates may be roughly divided into two groups according to the degree of acetylation thereof. One is cellulose triacetate (hereinafter referred to as CTA) having a degree of acetylation of not less than 59%. The other is cellulose diacetate of a wide range. Among them, those having a degree of acetylation of about 50 to 59% are referred to as cellulose diacetate (CDA). In other words, it is cellulose acetate soluble in acetone.

As for the use of cellulose acetate, in particular, CTA included, it can be used as various films including base materials for photographic film as well as fibers and medical materials. In general, a molded product of cellulose acetate is rigid and brittle. Such properties may become more significant the higher the acetylation degree becomes. Physical properties of polymeric materials greatly depend on their crystallizability. That is, those having a high crystallizability are imparted with strength while the flexibility thereof, for example, elongation is reduced, resulting in a brittle product. Of course, CTA is not an exception, and has high crystallizability due to the homogeneity of its structure. That is, in cellulose acetate, a higher degree of acetylation results in a higher crystallizability. In general, lower molecular weight material becomes a nucleus, forming a crystal. Accordingly, when CTA or CDA are used, a plasticizer is generally added to impart flexibility to the molded product. For example, acetate plastics used for a grip of a screw-driver and the like often utilizes a phthalate plasticizer such as diethyl phthalate. Cellulose acetate, particularly, CTA, is used as a raw material for various films due to its excellent transparency, while it has defects, for example, of providing a rigid and brittle film. To overcome its physical defects, a plasticizer is also used in this case. Addition of a component such as a plasticizer is accompanied not only with a poor yield of the final product due to bleedout during molding but also an economical disadvantage. Thus, cellulose acetate having excellent physical properties as well as characteristics of CTA has been expected.

On the other hand, due to the increase of the use of cellulose acetate, speeding up of processing techniques are required, and high speed molding, high speed spinning, high speed processing of the molded product have been tried. For example, in the production of a film, it is proposed to cast a solution of cellulose acetate at a high speed to mold into film. In order to improve the moldability corresponding to such a speeding up, it is proposed that the average degree of polymerization of cellulose acetate is reduced to the lower solution viscosity of cellulose acetate. However, when using cellulose acetate with a low degree of polymerization, the physical strength of the molded product is impaired.

Among cellulose acetates, cellulose triacetate, which has been used in various purposes, is crystalline and its solubility in a solvent is reduced as its crystallization properties increase. To improve the solubility in a solvent and moldability of cellulose triacetate, it is considered to be useful to make the cellulose triacetate amorphous or have a lower crystallizability by reducing the degree of substitution of the cellulose triacetate. However, when the degree of substitution of cellulose triacetate is reduced, the hygroscopicity is increased and the dimensional accuracy of the molded product is impaired.

Therefore, it is difficult to improve its solubility in a solvent, moisture resistance, moldability and the like by reducing the crystallizability of the cellulose acetate.

Accordingly, an object of the present invention is to further improve the characteristics of CTA and improve the physical properties of the molded product, and to provide a process for the production of such a cellulose acetate.

Another object of the present invention is to provide a cellulose acetate having low crystallizability and excellent moldability.

Still another object of the present invention is to provide a cellulose acetate having a high solubility in a solvent and moldability, in spite of having a high average degree of polymerization and high average degree of substitution.

DISCLOSURE OF THE INVENTION

The present inventors have studied intensively to attain the above objects. As a result, we have found that the reduction in crystallizability of the material results in an improvement in physical properties, in particular film strength, as well as improved flexibility of the molded product. Further, we have found that the crystallizability and the like have a great effect on the moldability of cellulose acetate. The present invention has been completed on the basis of this finding.

That is, the present invention relates to cellulose acetate having an average degree of acetylation of not less than 59%, a viscosity average degree of polymerization (DP) of not less than 290. and a concentrated solution viscosity ($\eta$), according to the falling ball viscosity method for viscosity average degree of polymerization (DP), is expressed by the following formula (1):

$$2.814 \times \ln(DP) - 11.753 \leq \ln(\eta) \leq 7.28 \times \ln(DP) - 37.059 \qquad (1)$$

In addition, the present invention relates to a process for producing cellulose acetate, wherein the average degree of acetylation is not less than 59%, viscosity average degree of polymerization (DP) is not less than 290. and concentrated solution viscosity ($\eta$) according to the falling ball viscosity measurement for viscosity average degree of polymerization (DP) is expressed by the following formula (2):

$$2.814 \times \ln(DP) - 11.753 \leq \ln(\eta) \leq 6.29 \times \ln(DP) - 31.469 \qquad (2)$$

which comprises reacting 10 to 15 parts by weight of sulfuric acid catalyst based on 100 parts by weight of cellulose.

After extensive investigation made for the purpose of attaining the above objects, the present inventors have found that crystallizability and the like has a great effect on the moldability of cellulose acetate. The present invention has been completed on the basis of this finding.

Cellulose acetate of the present invention is characterized by a heat of crystallization from the molten state (ΔHcr) of 5 to 17 J/g, and high moldability. The present invention includes the following aspects.

Cellulose acetate according to the present invention includes cellulose triacetate having a viscosity average degree of polymerization (DP) of not less than 200 and degree of acetylation of not less than 59%. Also included are cellulose triacetate having a high film moldability, viscosity average degree of polymerization (DP) of 200 to 400. degree of acetylation of 59.0 to 62.5, and heat of crystallization from the molten state (ΔHcr) of 5 to 16 J/g.

Cellulose acetate according to the present invention is preferably an acetate ester of cellulose (cellulose acetate), however, it may include a mixed acid ester with another organic acid, for example, an ester with a $C_{3-4}$ aliphatic organic acid such as cellulose acetate propionate, cellulose acetate butyrate, etc.), cellulose acetate phthalate, etc., a mixed acid ester with an inorganic acid (for example, cellulose acetate nitrate).

The above formula (1) in the present invention can be obtained from the experiments carried out by the present inventors. With cellulose acetate having a viscosity average degree of polymerization of not less than 290, the viscosity of the concentrated solution generally increases exponentially as the degree of polymerization increases, while cellulose acetate according to the present invention behaves in a different way. Accordingly, we calculated the formula (1) according by plotting viscosity average degree of polymerization against concentrated solution viscosity according to the falling ball viscosity test 1. It is particularly preferable to satisfy the following formula (2).

$$2.814 \times \ln(DP) - 11.753 \leq \ln(\eta) \leq 6.29 \times \ln(DP) - 31.469 \quad (2)$$

Cellulose acetate having a concentrated solution viscosity closer to the lower limit of formula (1) is likely to provide molded products, such as films, with excellent strength. Cellulose acetate which exhibits a concentrated solution viscosity exceeding the upper limit of formula (1) provides molded products, such as films, with poor physical strength. In general, it is difficult to produce cellulose acetate exhibiting a concentrated solution viscosity less than the lower limit of formula (1).

The method for measurement of the concentrated solution viscosity ($\eta$) according to the falling ball viscosity method is as follows:

Falling ball viscosity method 1

Cellulose acetate is dissolved in methylene chloride:methanol=8:2 (weight ratio) to obtain a solution having a cellulose concentration of 15% (by weight), and poured into a viscosity tube having an inner diameter of 2.6 mm and, after the temperature was adjusted to 25° C., a steel ball (diameter, 3.15 mm; 0.135 g) was allowed to fall and the time (sec.) required for the ball to fall for a distance of 10 cm between two gage marks was determined as the viscosity.

Cellulose acetate of the present invention can be produced by the sulfuric acid catalyst method. Cellulose acetate is generally produced by a process wherein cellulose is activated with acetic acid, etc., and triacetate is prepared with acetic anhydride using a sulfuric acid catalyst, then the degree of acetylation is adjusted by saponification (hydrolysis). In the crystallization of said cellulose acetate, various factors, for example, the amount of catalyst, reaction temperature, reaction time, aging temperature (saponification temperature), aging time (saponification time) and the like in the reaction step are complicatedly implicated. Accordingly, the heat of crystallization ΔHcr, average degree of polymerization DP and degree of acetylation can be controlled within a certain range by proper combination of the above factors. For example, to conveniently control heat of crystallization ΔHcr, a step wherein a relatively large amount of sulfuric acid is used for esterification and the degree of polymerization DP is controlled and to control the saponification temperature as well as the saponification time are useful. The amount of the sulfuric acid used varies depending on the other factors, however, it is 9 to 15 parts by weight, preferably about 10 to 15 parts by weight based on 100 parts by weight of cellulose. The saponification temperature is, for example, about 50 to 70° C., and the saponification time varies depending on the saponification temperature. However, it is, for example, selected from the range from about 10 to 35 minutes. Among them, the method utilizing a relatively large amount of sulfuric acid is particularly preferred. Sulfuric acid is reacted in an amount of 10 to 15 parts by weight, based on 100 parts by weight of cellulose, to provide a material for a film with excellent physical properties.

As described above, the physical properties of the molded product, such as a film, often depend on their crystallizability. In CTA, it is readily crystallized due to its homogeneous molecular structure, resulting in a rigid and brittle molded product. Accordingly, the present inventors considered mimicking the molecular structure of CDA to impair crystallizability. The present invention has been completed on the basis of this idea.

In general, CTA has a degree of acetylation of not less than 59% and most commercially available CTA has a degree of acetylation of about 61%. The main difference between CDA and CTA in their process for production resides in the hydrolysis step after preparing triacetate. In CDA, it is required to carry out hydrolysis to obtain a degree of acetylation necessary for it to be soluble in acetone, while it is preferable not to reduce the degree of acetylation of CTA. The main object of hydrolysis in CTA is to hydrolyze bonded sulfuric acid to enhance its thermostability. That is, sulfuric acid added as a catalyst bonds to cellulose, forming an ester. The more sulfuric acid catalyst that exists in an acetylation reaction, the more bonded sulfuric acid, resulting in the random distribution of glucose residues having unsubstituted hydroxyl groups in triacetate. It is considered that such cellulose acetate has a less complete cellulose acetate region taking part in the crystallization of the molecule, resulting in difficulty in crystallization.

The degree of acetylation can be lowered compared with that of the ordinary CTA by deacetylation during the hydrolysis step. However, the present inventors have found that use of a large amount of sulfuric acid catalyst in the acetylation step provides CTA with excellent physical properties.

The average degree of acetylation of the present invention is 59.0 to 62.5%. The reason is as follows. The present process using a large amount of sulfuric acid catalyst hardly provides a product with a degree of acetylation exceeding 62.5%. When the degree of acetylation exceeds 62.5%, there is little difference between the physical properties of the resulting product and those of the ordinary products. A degree of acetylation less than 59.0% is not preferred for a molded product, such as a film, because of, for example, its high hygroscopicity. The average degree of acetylation is more preferably in the range of 59.0 to 61.5%, particularly preferably 59.0 to 60.5%.

The reason for the improved physical properties of the film and the like is considered to be that the molecular structure becomes heterogeneous and unnecessary crystals are not formed during molding, thereby increasing amorphous portions in the film, imparting flexibility and further transparency to the film. Surprisingly, according to the present invention, a product with lower viscosity can be obtained compared with that having the same molecular weight obtained by an ordinary method. It has also been found that the process is advantageous in productivity. The fact that cellulose acetate obtained according to the present invention exhibits solution properties different from those of the ordinary products suggests the above mentioned unique structure.

In the present invention, the degree of acetylation of the obtained cellulose acetate is not less than 290, preferably not less than 310, because cellulose acetate with a degree of polymerization of less than 290 provides molded products, such as a film, fiber and the like, with an extremely poor strength.

Cellulose acetate of the present invention is characterized by a small heat of crystallization, that is, low crystallinity, high solubility in a solvent and high moldability. That is, the heat of crystallization of cellulose acetate from the molten state ($\Delta$Hcr) is 5 to 17 J/g, preferably 6 to 17 J/g (e.g., 7 to 16 J/g), more preferably 10 to 16 J/g. When the heat of crystallization $\Delta$Hcr is less than 5 J/g, moldability upon casting or the like is impaired as its solubility in a solvent decreases. When it is more than 17 J/g, its crystallinity increases, impairing its solubility in a solvent and increasing its solution viscosity, resulting in difficulty in molding at a high speed.

Since cellulose acetate of the present invention has the above mentioned heat of crystallization, in spite of having a high moisture resistance and dimensional stability as well as high degree of acetylation, it has a high solubility in a solvent and low solution viscosity as well as a high moldability at a high speed.

Since cellulose acetate of the present invention essentially has a low crystallizability, a molded product can be efficiently provided having a high moldability without any particular process. Cellulose acetate may be molded in various forms (e.g., powder, pellets, etc.) depending on the types of molding process, however, it is generally used as a cellulose acetate solution (dope).

Solvents for the cellulose acetate solution can be selected according to the degree of acetylation of the cellulose acetate, and include, for example, halogenated hydrocarbons such as chloroform, dichloromethane, dichloroethane; nitro compounds such as nitromethane; esters such as methyl acetate; ketones such as acetone; cellosolves such as methyl cellosolve acetate and the like. The solvent can be used alone or as a mixture thereof. In addition, carbon tetrachloride, alcohols such as methanol, ethanol, propanol, isopropanol, butanol, isobutanol and diacetone alcohol; nitropropane, ethyl acetate, butyl acetate, methyl propionate, ethyl lactate, methyl ethyl ketone, methyl cellosolve, cellosolve acetate and carbitols may be used, if necessary.

As described above, the cellulose acetate of the present invention has a high solubility in a solvent, even with a high degree of acetylation, and the cellulose acetate content in a solution and viscosity of the cellulose acetate solution can be selected depending on the application. The solution viscosity of cellulose acetate can be an index of its high speed moldability, particularly in the casting and spinning methods. That is, since cellulose acetate having a low solution viscosity enables cast coating and spinning at high speeds, and the surface becomes smooth in a short time (that is, high leveling), even high speed molding provides a molded product having high moldability, resulting in improved production. The solution viscosity of cellulose acetate can be selected from the range wherein its moldability at high speed is not impaired, for example, a 15% solution viscosity containing 13% by weight of cellulose acetate and 2% by weight of triphenyl phosphate is 20 to 70 seconds, is preferably about 30 to 65 seconds according to the falling ball viscosity method 2 described below.

Falling ball viscosity method 2

Cellulose acetate such as CTA (42.7 parts by weight) is dissolved in a solvent mixture containing triphenyl phosphate [triphenylphosphate/n-butanol/methanol/dichloromethane=6.8:8.4:42.1:230 (weight ratio)] (287.3 parts by weight) to obtain a solution of cellulose acetate having 15% by weight of a solids content, including triphenyl phosphate. The solution is filled in a viscosity tube, then a steel ball is allowed to fall through the solution at 25° C. and the time (sec.) required for the steel ball to fall for a distance between two gage marks is determined as the viscosity of a 15% solution.

For molding of the cellulose acetate of the present invention, it can be used with another cellulose acetate ester (for example, an ester with an organic acid such as cellulose propionate, cellulose butyrate; an ester with an inorganic acid such as cellulose nitrate, cellulose sulfate, cellulose phosphate and the like). To the cellulose acetate may be optionally added, in addition to the above solvents, various additives, for example, an ester-type plasticizer (e.g., triacetin, triethylene glycol diacetate, triethylene glycol dipropionate, dibutyl phthalate, dimethoxyethyl phthalate, triethyl citrate ester, etc.), inorganic fine particles (e.g., kaolin, talc, diatomaceous earth, quartz, calcium carbonate, barium sulfate, titanium oxide, alumina, etc.), a thermostabilizer (e.g., salt of alkaline earth metal such as calcium, magnesium, etc.), a coloring agent, etc.

Cellulose acetate of the present invention may be used in various molding methods to provide molded products. For example, it can be used in a process for the production of a film or sheet (photographic film, etc.) by casting methods, including the spinning method, a process for the production of fibers by spinning. Further, cellulose acetate of the present invention can be utilized in the applications of, for example, plastics, lacquer of paint, electrical insulating material and the like.

BRIEF DESCRIPTION OF THE DRAWING

FIG. 1 is a chart showing the results of the measurement of the heat of crystallization of cellulose acetate obtained in Examples 6 and 7. Comparative Example 5.

EXAMPLES

The following Examples will further illustrate the present invention, which by no means limit the present invention.

(1) Method for measuring and calculating viscosity average degree of polymerization.

Oven-dried cellulose acetate (about 0.2 g, precisely weighed) is dissolved in a solution of methylene chloride:ethanol=9:1 (100 ml). The time (sec.) required for the solution to drop is measured by an Ostwald viscometer at 25° C. The degree of polymerization is obtained according to the following formula. As for the solvent mixture alone, the time (sec.) required for dropping is measured in the same manner as described above, and the viscosity average degree of polymerization is calculated according to the following formula.

$$\eta_{rel} = t/t_o$$

$$[\eta] = (\ln \eta_{rel})/c$$

$$DP = [\eta]/(6 \times 10^{-4})$$

(wherein, t is the time (sec.) required for the sample solution to drop, $t_o$ is the time (sec.) required for the solvent to drop and c is the concentration of cellulose acetate in the solution (g/liter)).

(2) Heat of crystallization (ΔHcr)

The crystallizability of cellulose acetate, such as CTA, can be evaluated using a thermocompensating differential scanning calorimeter (DSC). That is, cellulose acetate is dissolved in a mixed solvent (dichloromethane/ethanol=9/1 (weight ratio)) to prepare a solution with a cellulose acetate concentration of 15% by weight (dope), which is subjected to pressure filtration using an unwoven fabric. The resulting dope is cast on a smooth glass sheet using a bar coater and, after being air-dried for a day, the produced film is peeled off from the glass sheet and dried in a vacuum at 80° C. for 4 hours. The thus obtained film-like sample (10 mg) is filled in a standard aluminum pan, mounted on a sample bed of the calorimeter, maintained at a melting point corresponding to the type of cellulose acetate for a short time to melt the cellulose acetate, then cooled to room temperature at the cooling rate of 4° C./min. to crystallize. CTA can be molten by maintaining it at 305° C. for 2 minutes.

The heat of crystallization (ΔHcr) is obtained from the exothermic peak area under the thus obtained DSC curve. The measurement of DSC is carried out in an atmosphere of nitrogen and temperature calibration is carried out by two-point calibration of In (m.p.: 156.60° C.) Sn (m.p.: 231.88° C.), while heat calibration is carried out by one-point calibration of In (quantity of heat of fusion: 28.45 J/g). Analysis of the crystallization temperature is according to JIS K 7121-1987 and the heat of crystallization is according to JIS K 7122-1987.

(3) Degree of acetylation

The degree of acetylation can be determined by the saponification method. That is, dried cellulose acetate, such as CTA (1.9 g), is precisely weighed, and dissolved in 150 ml of a mixed solvent of acetone and dimethylsulfoxide (4:1, volume ratio), to which was added 1N aqueous sodium hydroxide and saponified at 25° C. for 2 hours. Phenolphthalin is added as an indicator and an excess of sodium hydroxide is titrated with 1N sulfuric acid (concentration factor: F). In the same method as described above, a blank test is carried out. The degree of acetylation is calculated according to the following formula:

Degree of acetylation (%)=(6.005×(B−A)×F)/W (wherein A is volume (ml) of 1N sulfuric acid required for titration of the sample, B is volume (ml) of 1N sulfuric acid required for titration of blank test, F is a concentration factor of 1N sulfuric acid, W is weight of the sample).

(4) Process for preparing film

The film used for the measurement of mechanical strength was prepared by dissolving a given amount of cellulose acetate and a plasticizer in a solvent, filtered and cast on a glass sheet, keeping the clearance and casting speed constant, followed by drying.

(5) Physical properties of film

Physical properties of the film were measured as (i) tensile elongation, (ii) tensile strength (iii) tearing strength and (iv) bending strength. Each evaluation method is shown below.

(i) Measurement of tensile elongation

Film cut into 10 cm length was stretched (initial length of the sample, 5 cm; stretching rate, 20 mm/min) according to ISO1184-1983. Tensile elongation was obtained from the elongation of the film at the breaking point.

(ii) Measurement of tensile strength

Film cut into 10 cm length (initial length of the sample, 5 cm) was stretched at a stretching speed of 20 mm/min. according to ISO1184-1983. and the tensile strength was obtained from the load at the breaking point.

(iii) Measurement of tearing strength

Load required for tearing was determined according to ISO6383/2-1983 using film cut into 5×6.4 cm.

(iv) Bending strength

According to ISO8776-1988 using film cut into pieces of 12 cm length, the number of reciprocated bending required for the film to be broken was determined.

Example 1

Cellulose (100 parts by weight) was esterified using sulfuric acid (11.7 parts by weight), acetic anhydride (260 parts by weight) and acetic acid (450 parts by weight) according to an ordinary method. Thereafter, hydrolysis was carried out to give cellulose acetate having a degree of acetylation of 60.2%, viscosity average degree of polymerization of 313, crystallization temperature (peak temperature Tpc) of 225° C., and heat of crystallization ΔHcr of 14.0 J/g. The relation between viscosity average degree of polymerization and concentrated solution falling ball viscosity was expressed as ln(η)=4.53, that is, 4.41<ln(η)<4.68<4.77, which satisfied formulae (1) and (2). The physical properties of the CTA are given in Table 1.

Example 2

Cellulose (100 parts by weight) was esterified using sulfuric acid (11.7 parts by weight), acetic anhydride (260 parts by weight) and acetic acid (450 parts by weight) according to an ordinary method. Thereafter, hydrolysis was carried out for a longer period than that in Example 1, and the resulting cellulose acetate had a degree of acetylation of 59.8%, viscosity average degree of polymerization of 326, crystallization temperature (peak temperature Tpc) of 217° C. and heat of crystallization ΔHcr of 12.2 J/g. The relation between viscosity average degree of polymerization and concentrated solution falling ball viscosity was expressed as ln(η)=4.80, that is, 4.53<ln(η)<4.93<5.07, which satisfied formulae (1) and (2). The physical properties of this film are given in Table 1.

Example 3

Cellulose (100 parts by weight) was esterified using sulfuric acid (10.2 parts by weight), acetic anhydride (260 parts by weight) and acetic acid (450 parts by weight) according to an ordinary method. Thereafter, hydrolysis was carried out and the resulting cellulose acetate had a degree of acetylation of 60.6%, viscosity average degree of polymerization of 315, crystallization temperature (peak temperature Tpc) of 233° C. and heat of crystallization ΔHcr of 15.8 J/g. The relation between viscosity average degree of polymerization and concentrated solution falling ball viscosity was expressed as ln(η)=4.75, that is, 4.43<4.71<ln(η)<4.82, which did not satisfy formula (2) but (1). The physical properties of the CTA are given in Table 1.

Example 4

Cellulose (100 parts by weight) was esterified using sulfuric acid (11.7 parts by weight), acetic anhydride (260 parts by weight) and acetic acid (450 parts by weight) according to an ordinary method. Thereafter, hydrolysis was carried out and the resulting cellulose acetate had a degree of acetylation of 60.2%, viscosity average degree of polymerization of 298, crystallization temperature (peak temperature Tpc) of 225° C. and heat of crystallization ΔHcr of 14.0 J/g. The relation between viscosity average degree of polymerization and concentrated solution falling ball viscosity was expressed as ln(η)=4.32, that is, 4.28<ln(η) <4.37<4.42, which satisfies formulae (1) and (2). The physical properties of the CTA film are given in Table 1.

Example 5

Cellulose (100 parts by weight) was esterified using sulfuric acid (10.2 parts by weight), acetic anhydride (260 parts by weight) and acetic acid (450 parts by weight) according to an ordinary method. Thereafter, hydrolysis was carried out and the resulting cellulose acetate had a degree of acetylation of 60.8%, viscosity average degree of polymerization of 295, crystallization temperature (peak temperature Tpc) of 237° C. and heat of crystallization ΔHcr of 16.7 J/g. The relation between viscosity average degree of polymerization and concentrated solution falling ball viscosity was expressed as ln(η)=4.33, that is, 4.25<4.30<ln(η)<4.34, which did not satisfy formula (2) but (1). The physical properties of such CTA film are given in Table 1.

Comparative Example 1

Cellulose (100 parts by weight) was esterified using sulfuric acid (8 parts by weight), acetic anhydride (260 parts by weight) and acetic acid (450 parts by weight) according to an ordinary method. Thereafter, hydrolysis was carried out and the resulting cellulose acetate had a degree of acetylation of 61.1%, viscosity average degree of polymerization of 322, crystallization temperature (peak temperature Tpc) of 243° C. and heat of crystallization ΔHcr of 18.2 J/g. The relation between viscosity average degree of polymerization and concentrated solution falling ball viscosity was expressed as ln(η)=5.05, that is, 4.50<4.85<4.98<ln(η), which did not satisfy formulae (1) and (2). The physical properties of the CTA are given in Table 1.

Comparative Example 2

Cellulose (100 parts by weight) was esterified using sulfuric acid (8 parts by weight), acetic anhydride (260 parts by weight and acetic acid (450 parts by weight) according to an ordinary method for a shorter time compared with that in Comparative Example 1. Thereafter, hydrolysis was carried out and the resulting cellulose acetate had a degree of acetylation of 60.9%, viscosity average degree of polymerization of 293, crystallization temperature (peak temperature Tpc) of 239° C. and heat of crystallization ΔHcr of 17.4 J/g. The relation between viscosity average degree of polymerization and concentrated solution falling ball viscosity was expressed as ln(η)=4.35, that is, 4.23<4.26<4.29<ln(η), which did not satisfy formulae (1) and (2). The physical properties of the CTA film are given in Table 1.

Comparative Example 3

Cellulose (100 parts by weight) was esterified using sulfuric acid (8 parts by weight), acetic anhydride (260 parts by weight) and acetic acid (450 parts by weight) according to an ordinary method. Thereafter, hydrolysis was carried out and the resulting cellulose acetate had a degree of acetylation of 60.9%, viscosity average degree of polymerization of 312, crystallization temperature (peak temperature Tpc) of 239° C. and heat of crystallization ΔHcr of 17.2 J/g. The relation between viscosity average degree of polymerization and concentrated solution falling ball viscosity was expressed as ln(η)=4.86, that is, 4.41<4.65<4.75<ln(η), which did not satisfy formulae (1) and (2). The physical properties of the CTA film are given in Table 1.

Comparative Example 4

Cellulose (100 parts by weight) was esterified using sulfuric acid (6 parts by weight), acetic anhydride (260 parts by weight) and acetic acid (450 parts by weight) according to an ordinary method. Thereafter, hydrolysis was carried out and the resulting cellulose acetate had a degree of acetylation of 61.8%, viscosity average degree of polymerization of 280, crystallization temperature (peak temperature Tpc) of 257° C. and heat of crystallization ΔHcr of 21.3 J/g. The relation between viscosity average degree of polymerization and concentrated solution falling ball viscosity was expressed as ln(η) =4.50, that is, 3.96<3.97<4.10 <ln(η), which did not satisfy formulae (1) and (2). The physical properties of the CTA film are given in Table 1.

TABLE 1

| | Physical Properties (MD/TD) | | | |
|---|---|---|---|---|
| | Tensile Elongation (%) | Tensile Strength (kg/mm$^2$) | Tearing Strength (gf) | Bending strength |
| Example 1 | 51/56 | 12.7/12.4 | 33/33 | 140/150 |
| Example 2 | 54/55 | 13.2/12.6 | 33/32 | 160/152 |
| Example 3 | 50/51 | 12.6/12.3 | 30/26 | 145/127 |
| Example 4 | 51/50 | 12.7/12.5 | 28/27 | 137/131 |
| Example 5 | 48/47 | 12.5/12.3 | 26/25 | 125/117 |
| Comparative Example 1 | 44/50 | 12.4/12.3 | 16/17 | 105/100 |
| Comparative Example 2 | 41/42 | 11.7/11.3 | 25/23 | 120/116 |
| Comparative Example 3 | 50/47 | 11.0/12.0 | 26/23 | 130/118 |
| Comparative Example 4 | 40/39 | 12.6/10.5 | 16/17 | 100/89 |

MD: Direction of casting film
TD: Direction perpendicular to that of casting film Example 6

Cellulose (moisture content 4%) was activated by a pretreatment with acetic acid, then esterified with sulfuric acid (11.7 parts by weight), acetic anhydride (258 parts by weight) and acetic acid (440 parts by weight), based on 100 parts by weight of cellulose acetate, and neutralized with magnesium acetate. The resulting cellulose acetate was saponified and aged to obtain CTA with a viscosity average degree of polymerization of 319 and degree of acetylation of 60.0%. The relation between viscosity average degree of polymerization and concentrated solution falling ball viscosity of the CTA was expressed as ln(η)=4.65, that is, 4.47<ln(η)<4.79<4.91, which satisfied formulae (1) and (2). The saponification time was 30 minutes.

Example 7

In the same manner as described in Example 6, except that the saponification time was shortened to 25 minutes and the amount of acetic anhydride used was 265 parts by weight, CTA with a viscosity average degree of polymerization of 323 and degree of acetylation of 60.2% was obtained. The relation between viscosity average degree of polymerization and concentrated solution falling ball viscosity of the CTA was expressed as $\ln(\eta)=4.76$, that is, $4.51<\ln(\eta)<4.87<5.00$, which satisfied formulae (1) and (2).

Comparative Example 5

In the same manner as described in Example 6, except that the amount of sulfuric acid used was reduced to 7.8 parts by weight and the saponification time was 40 minutes, CTA with a viscosity average degree of polymerization of 322 and degree of acetylation of 61.1% was obtained. The relation between the viscosity average degree of polymerization and concentrated solution falling ball viscosity of the CTA was expressed as $\ln(\eta)=5.05$, that is, $4.50<4.85<4.98<\ln(\eta)$, which did not satisfy formulae (1) and (2).

The crystallization temperature (peak temperature Tpc), heat of crystallization ΔHcr, 15% solution viscosity (falling ball viscosity method 2) and film moldability, physical properties of the films of the cellulose acetates obtained in the above Examples 6, 7 and Comparative Example 5 were examined. As the results, the results given in Table 2 were obtained. In addition, the results of the measurement of the heat of crystallization (chart) are shown in FIG. 1. As for film moldability, a solution containing the cellulose acetate of Examples 6, 7 or Comparative Example 5 at the concentration of 15% by weight (dope) was prepared in the same manner as described in the section of the above heat of crystallation (ΔHcr), each solution dropped onto a smooth glass sheet with spaces, each dropped sample cast using a bar coater and then the surface condition of the coated film relatively observed and compared. The film moldability of the sample was evaluated by ranking in the order of excellent, good and bad, the sample wherein the surface becomes smooth in the shortest time being evaluated as excellent and the sample requiring the longest time for the surface to become smooth being evaluated as bad.

TABLE 2

|  | Example 6 | Example 7 | Comparative Example 5 |
| --- | --- | --- | --- |
| Degree of acetylation (%) | 60.0 | 60.2 | 61.1 |
| Average Degree of polymerization | 319 | 323 | 322 |
| Crystallization Temperature Tpc (°C.) | 220 | 224 | 241 |
| Heat of Crystallization ΔHcr (J/g) | 12.5 | 14.0 | 17.5 |
| Dropping time (sec.) of 15% Solution Viscosity | 55 | 61 | 82 |
| Film Moldability | Excellent | Excellent | bad |
| Tensile Elongation (%) | 48/54 | 44/43 | 44/43 |
| Tensile Strength (kg/mm²) | 12.9/12.9 | 12.3/11.3 | 12.0/12.0 |
| Tearing Strength (gf) | 27/28 | 32/32 | 23/25 |
| Bending Strength | 171/171 | 132/119 | 104/101 |

As is obvious from Table 2, the cellulose acetate of Comparative Example 5 had a high viscosity of concentrated solution and insufficient film moldability in spite of having a high degree of polymerization. on the other hand, the cellulose acetates of Examples 6 and 7 had a low concentrated solution viscosity and high moldability in spite of having a high degree of polymerization and degree of acetylation.

Example 8

In the same manner as described in Example 6, except that the saponification time was changed to 120 minutes and the amount of acetic anhydride used was 260 parts by weight, CTA with a viscosity average degree of polymerization of 291, degree of acetylation of 59.0%, crystallization temperature (peak temperature, Tpc) of 201° C., heat of crystallization ΔHcr of 8.5 J/g, and 15% solution viscosity (falling ball viscosity method 2) of 35.5 was obtained. The relation between viscosity average degree of polymerization and concentrated solution falling ball viscosity of the CTA was expressed as $\ln(\eta)=4.22$, that is, $4.21<\ln(\eta)\leq 4.22<4.24$, which satisfied formulae (1) and (2).

Comparative Example 6

In the same manner as described in Example 6, except that the amount of sulfuric acid used and the saponification time were adjusted, CTA with a viscosity average degree of polymerization of 134 and degree of acetylation of 57.6% was obtained. The relation between viscosity average degree of polymerization and concentrated solution falling ball viscosity of the CTA was expressed as $\ln(\eta)=2.95$, which did not satisfy formulae (1) and (2). The heat of crystallization ΔHcr was determined but the crystallization behavior was not observed and the heat of crystallization ΔHcr was 0 J/g. In the same manner as described in the section of heat of crystallization, a solution containing 15% by weight of cellulose acetate (dope) was prepared, which was clouded with cellulose acetate incompletely dissolved in a solvent and unsuitable for molding film. The physical properties of the film were as follows and unsuitable for practical use: tensile elongation, 30/25 (%); tensile strength 7.0/6.5 (kg/mm²); tearing strength 13/11 (gf); and bending strength (85/97).

Cellulose acetate of the present invention has improved physical properties of the molded product, particularly film strength, and improved flexibility. In addition, it has a small heat of crystallization, low crystallizability and excellent moldability. Further, it has a high solubility in a solvent and high moldability, in spite of having a high average degree of polymerization and average degree of substitution. Accordingly, a molded product with a high moisture resistance and dimensional accuracy could be obtained by a molding process with a high processing speed using a cellulose acetate solution with a low solution viscosity.

What is claimed is:

1. A process for preparing a cellulose acetate characterized by having an average degree of acetylation of not less than 59%, viscosity average degree of polymerization (DP) of not less than 290 and concentrated solution viscosity (η), according to the falling ball viscosity method for viscosity average degree of polymerization (DP), expressed by the following formula (1):

$$2.814\times\ln(DP)-11.753\leq\ln(\eta)\leq 7.28\times\ln(DP)-37.059 \qquad (1),$$

comprising the steps of activating cellulose with acetic acid and reacting the activated cellulose with acetic anhydride in the presence of 10–15 parts by weight of a sulfuric acid catalyst, based on 100 parts by weight cellulose.

2. The process for preparing a cellulose acetate according to claim 1, wherein the cellulose acetate is characterized by having a concentrated solution viscosity (η), according to the falling ball viscosity method for viscosity average degree of polymerization (DP), expressed by the following formula (2):

$$2.814\times\ln(DP)-11.753\leq\ln(\eta)\leq 6.29\times\ln(DP)-31.469 \qquad (2).$$

3. The process for preparing a cellulose acetate according to claim 1, wherein the viscosity average degree of polymerization (DP) of the product cellulose acetate is not less than 310.

4. The process for preparing a cellulose acetate according to claim 1, wherein the average degree of acetylation of the product cellulose acetate is from 59 to 62.5%.

5. The process for preparing a cellulose acetate according to claim 4, wherein the average degree of acetylation of the product cellulose acetate is from 59 to 61.5%.

6. The process for preparing a cellulose acetate according to claim 5, wherein the average degree of acetylation of the product cellulose acetate is from 59 to 60.5%.

7. The process for preparing a cellulose acetate according to claim 1, wherein the heat of crystallization (ΔHcr) of the product cellulose acetate from the molten state is from 5 to 17 J/g.

8. The process for preparing a cellulose acetate according to claim 7, wherein the heat of crystallization (ΔHcr) of the product cellulose acetate from the molten state is from 5 to 16 J/g.

9. The process for preparing a cellulose acetate according to claim 2, wherein the viscosity average degree of polymerization (DP) of the product cellulose acetate is not less than 310.

\* \* \* \* \*